US010938866B1

(12) United States Patent
Duperre et al.

(10) Patent No.: US 10,938,866 B1
(45) Date of Patent: Mar. 2, 2021

(54) METHOD AND SITE SELECTION CONTROLLER FOR SELECTING A SERVING SITE FOR A SESSION

(71) Applicant: TECHNOLOGIES EDGEGAP INC., Saint-Jean-sur-Richelieu (CA)

(72) Inventors: Mathieu Duperre, Saint-Jean-sur-Richelieu (CA); Bastien Roy-Mazoyer, Saint-Jean-sur-Richelieu (CA)

(73) Assignee: TECHNOLOGIES EDGEGAP INC., St-Jean-sur-Richelieu (CA)

(*) Notice: Subject to any disclaimer, the term of this patent is extended or adjusted under 35 U.S.C. 154(b) by 0 days.

(21) Appl. No.: 17/001,650

(22) Filed: Aug. 24, 2020

Related U.S. Application Data

(63) Continuation of application No. PCT/CA2020/050122, filed on Feb. 3, 2020.

(60) Provisional application No. 62/803,777, filed on Feb. 11, 2019.

(51) Int. Cl.
*H04L 29/06* (2006.01)
*H04L 12/26* (2006.01)

(52) U.S. Cl.
CPC .......... *H04L 65/1069* (2013.01); *H04L 43/06* (2013.01); *H04L 43/087* (2013.01); *H04L 65/403* (2013.01)

(58) Field of Classification Search
CPC ............ H04L 65/1066; H04L 65/1069; H04L 65/403; H04L 67/18; H04L 43/52; H04L 43/08
USPC ....................................................... 709/227
See application file for complete search history.

(56) References Cited

U.S. PATENT DOCUMENTS

| 6,345,279 | B1 | 2/2002 | Grimm et al. | |
|---|---|---|---|---|
| 2003/0056002 | A1* | 3/2003 | Trethewey | H04L 67/1002 709/238 |
| 2003/0152034 | A1* | 8/2003 | Zhang | H04L 43/0852 370/252 |
| 2006/0258463 | A1 | 11/2006 | Cugno et al. | |

FOREIGN PATENT DOCUMENTS

WO  WO2008104782 A2  9/2008

OTHER PUBLICATIONS

International Search Report of PCT/CA2020/050122; dated May 8, 2020; C. Wong.

* cited by examiner

*Primary Examiner* — Glenford J Madamba
(74) *Attorney, Agent, or Firm* — BCF, LLP

(57) ABSTRACT

A site selection controller receives, from at least one requesting entity, at least one request for establishing a session. Contents of the at least one request define a geographical distribution of participants to a session. Geographically distributed sites are preselected from a list of potential serving sites based on the geographical distribution of the participants. A probe request is sent to each of the preselected sites and at least one probe response is received. A serving site is selected for the session based on the received probe responses. An identification of the selected site for the session is sent to the at least one requesting entity. A requesting entity may include an application server. Alternatively, several users may request the establishment of the session. The probe response may provide a latency value between the preselected sites and the participants.

26 Claims, 13 Drawing Sheets

METHOD AND SITE SELECTION CONTROLLER FOR SELECTING A SERVING SITE FOR A SESSION

CROSS-REFERENCE

The present application is a continuation of International Application No. PCT/CA2020/050122, filed on Feb. 3, 2020, and claims priority from U.S. Provisional Application No. 62/803,777, filed on Feb. 11, 2019, the entirety of both of which is incorporated by reference herein.

TECHNICAL FIELD

The present disclosure relates to the field of real-time session management. More specifically, the present disclosure relates to a method and to a site selection controller for selecting a serving site for a session.

BACKGROUND

Real-time communication sessions are currently established over the Internet for a wide variety of applications. A very popular application is online gaming in which users (oftentimes called "garners") are connected in a collaborative or competitive gaming experience. Another very popular application includes live video conferencing using voice over IP (VoIP) technology. Popular video conferencing platforms include Webex™' Facetime™, and Skype™, among others. IP television (IPTV) is also becoming collaborative as a plurality of users may concurrently share uploaded contents and live streams.

While online gaming, video conferencing and collaborative content sharing usually involve the active participation of users on their devices, other examples of real-time communication sessions are increasingly becoming prevalent. The advent of Internet of Things (IoT) for example will involve real-time communication between objects with no particular or direct intervention for users. A particular example of such real-time communication concerns self-driving vehicles that will increasingly communicate with one another and with devices positioned at fixed locations along the road to help guiding these vehicles. Another particular example concerns telemedicine in which people wear devices, for example as parts of garments, that include a variety of sensors that send biometric information of the wearer on an ongoing basis.

In this context, real-time communication may be understood as a live communication established between two or more connected devices, with or without direct involvement of users. Also in this context, a device may include any one of a computer, a laptop, a tablet, a cellular terminal, an intelligent terminal, an intelligent garment, a self-driving car, a gaming console, an IoT device, and the like.

The quality of a real-time communication experience may be very dependent on a latency of communication between the connected devices. In addition to latency issues, jitter issues may also be problematic. While latency is defined as delays in the communication between two or more devices, jitter may be expressed in terms of variability of the latency. For some applications, for example for self-driving cars, latency may be a critical factor. For video streaming, some latency may be acceptable while jitter may severely impact the video experience. Online gaming and video conferencing are sensitive to both latency and jitter. For telemedicine, latency of a few seconds may be acceptable for remote health monitoring; any measurable jitter level and latency of more than a few milliseconds may not be acceptable for remote surgery.

A large number of applications that use real-time communication are installed on application servers that rely on distributed nodes, or "sites", for real-time processing. These sites may come in a wide variety of types including, without limitation, datacenters, cellular sites, wireless access points, edge servers, micro-sites, and the like. In fact, any device having data processing and wired or wireless communication capabilities may become a site used for real-time processing, if allowed by the owner/operator of the device.

Nodes or sites that may be used for processing in the course of a real-time communication session have variable capabilities in terms of processing power and in terms of equipment that they contain. They are distributed geographically, sometimes with variable density. Depending on which site is selected to support a real-time communication session, the quality of service (QoS) in terms of latency and jitter may range from excellent to very poor. To illustrate, a videoconference may be initiated by a first participant located in Asia before three (3) more participants located in North America join the videoconference. A site supporting the videoconference may be selected in Asia, based on the location of the first participant. Latency may be very poor between the three (3) participants located in North America.

Current solutions that select sites for supporting real-time communication sessions fail to overcome the above-described problems.

Therefore, there is a need for improvements that compensate for problems related to latency and jitter in real-time communication.

SUMMARY

According to the present disclosure, there is provided a method implemented in a site selection controller. The site selection controller receives, from at least one requesting entity, at least one request for establishing a session. Contents of the at least one request define a geographical distribution of one or more participants to a session. The site selection controller preselects one or more geographically distributed sites from a list of potential serving sites based on the geographical distribution of the participants to the session. The site selection controller sends a probe request to each of the preselected sites. Probe responses are received at the site selection controller from at least one of the preselected sites. The site selection controller selects a serving site for the session among the preselected sites based on the received probe responses and then responds to the at least one requesting entity by sending an identification of the selected site for the session.

According to the present disclosure, there is also provided a site selection controller comprising a network interface, a processor and a memory. The network interface is adapted for communicating with at least one requesting entity and with a plurality of potential serving sites. The processor communicates with the network interface. The memory includes a non-transitory computer-readable medium having stored thereon machine executable instructions for performing the method when executed by the processor.

The present disclosure further relates to a network that comprises a plurality of user devices, at least one application server, a plurality of potential serving sites and the site selection controller. The site selection controller is in communication with the plurality of user devices, the at least one application server and the plurality of potential serving sites.

The foregoing and other features will become more apparent upon reading of the following non-restrictive description of illustrative embodiments thereof, given by way of example only with reference to the accompanying drawings.

BRIEF DESCRIPTION OF THE DRAWINGS

Embodiments of the disclosure will be described by way of example only with reference to the accompanying drawings, in which.

Like numerals represent like features on the various drawings.

DETAILED DESCRIPTION

Various aspects of the present disclosure generally address one or more of the problems related to latency and jitter in real-time communication.

Generally speaking, the present disclosure introduces a site selection controller, and a method implemented in the site selection controller, for selection one among a plurality of potential serving sites for serving a session. A preselection is made of the potential serving sites based on their geographical location and on geographical locations of devices for which the session is being established. A probe request is sent to each preselected site. A response should be received from each preselected site, although in practice some preselected sites may fail to respond. A service site for the session is selected based on the received responses. In an aspect, the selection may be based on scores calculated based on latency and/or jitter information included the received responses.

In some embodiments, the preselection may further be based on a context for the session, including for example a type of application, a type of devices for the session, a time of establishment of the session, and capabilities of the potential serving sites for the session. In the same or other embodiments, a machine learning entity may account for past performance a particular serving site. In the same or other embodiments, an artificial intelligence entity may autonomously trigger the establishment of a new session based on past experience related to sessions for a given service type at a particular time.

Figure 1:
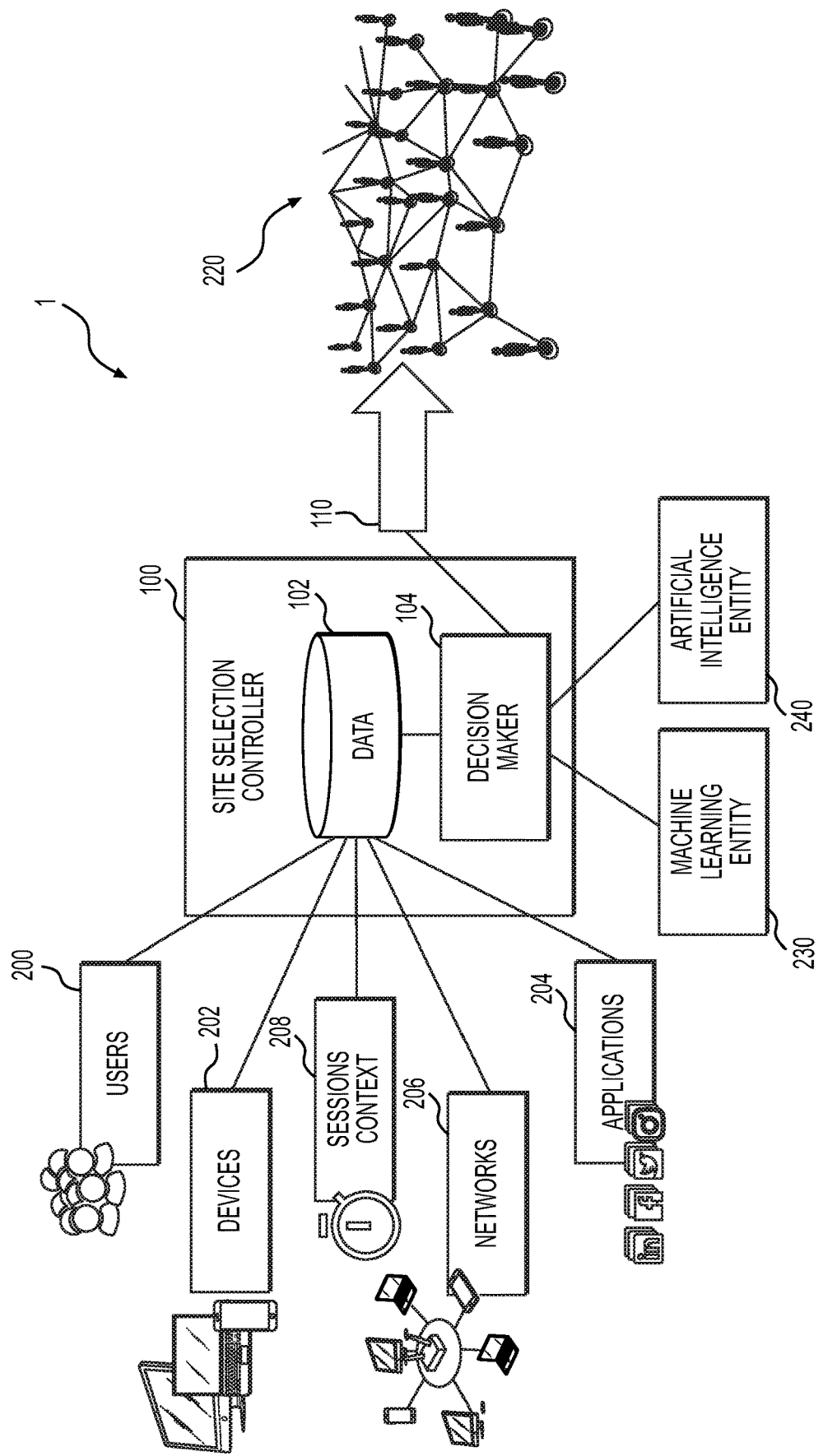
FIG. 1 is a high-level diagram of a network according to an aspect of the present disclosure.

Referring now to the drawings, FIG. 1 is a high-level diagram of a network according to an aspect of the present disclosure. A network 1 comprises a site selection controller 100, a plurality of users 200, a plurality of devices 202 that may or may not be associated with respective users 200, a plurality of application servers 204, assorted networks 206 and various types of information elements that define session contexts 208 for real-time communication sessions. The site selection controller 100 contains a data repository 102 for storing data acquired from or associated to the users 200, the devices 202, the application servers 204, the networks 206 and the session contexts 208. A decision maker 104 of the site selection control 100, for example a processor, issues probe requests 110 toward a plurality of potential serving sites 220 for serving sessions to the benefits of the users 200 and/or of the devices 202. A machine learning entity 230 for analyzing past site selection performance and an artificial intelligence entity 240 for new session prediction may also be communicatively connected to the site selection controller 100. In an embodiment, the machine learning entity 230 and/or the artificial intelligence entity 240 may be integrated within the site selection controller 100.

Figure 2:
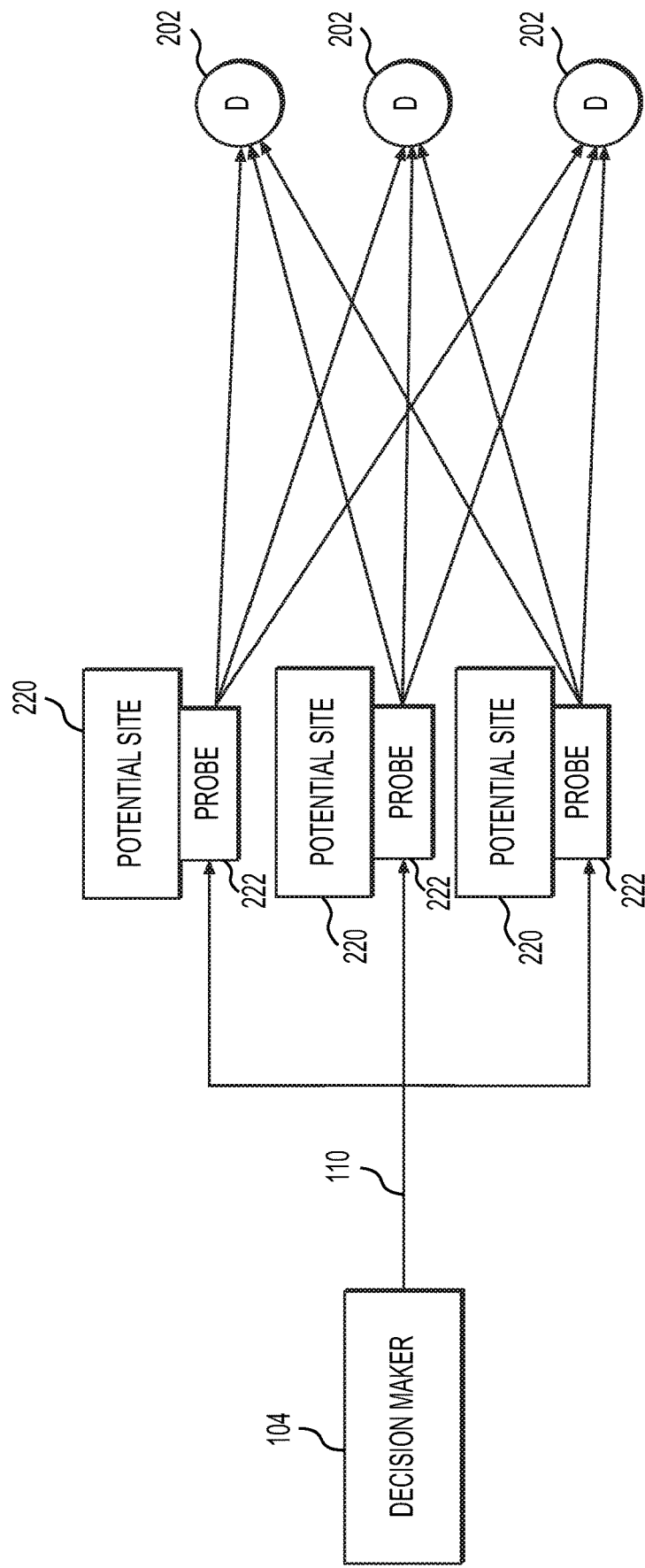
FIG. 2 provides additional details of components of the network of FIG. 1.

FIG. 2 provides additional details of components of the network of FIG. 1. The decision maker 104 issues the probe requests 110 toward a plurality of preselected sites 220. In turn, probe devices 222 in each of the preselected sites send probes signals toward devices 202 that involved in a session that is being established. Responses sent from the devices 202 to the probe devices 222 allow to form an estimating of a quality of service (QoS) that may be achieved between each preselected site 220 and each device 202. The manner in which some of the potential serving sites 220 are preselected by site session controller 100 will be described hereinbelow.

Figure 3:
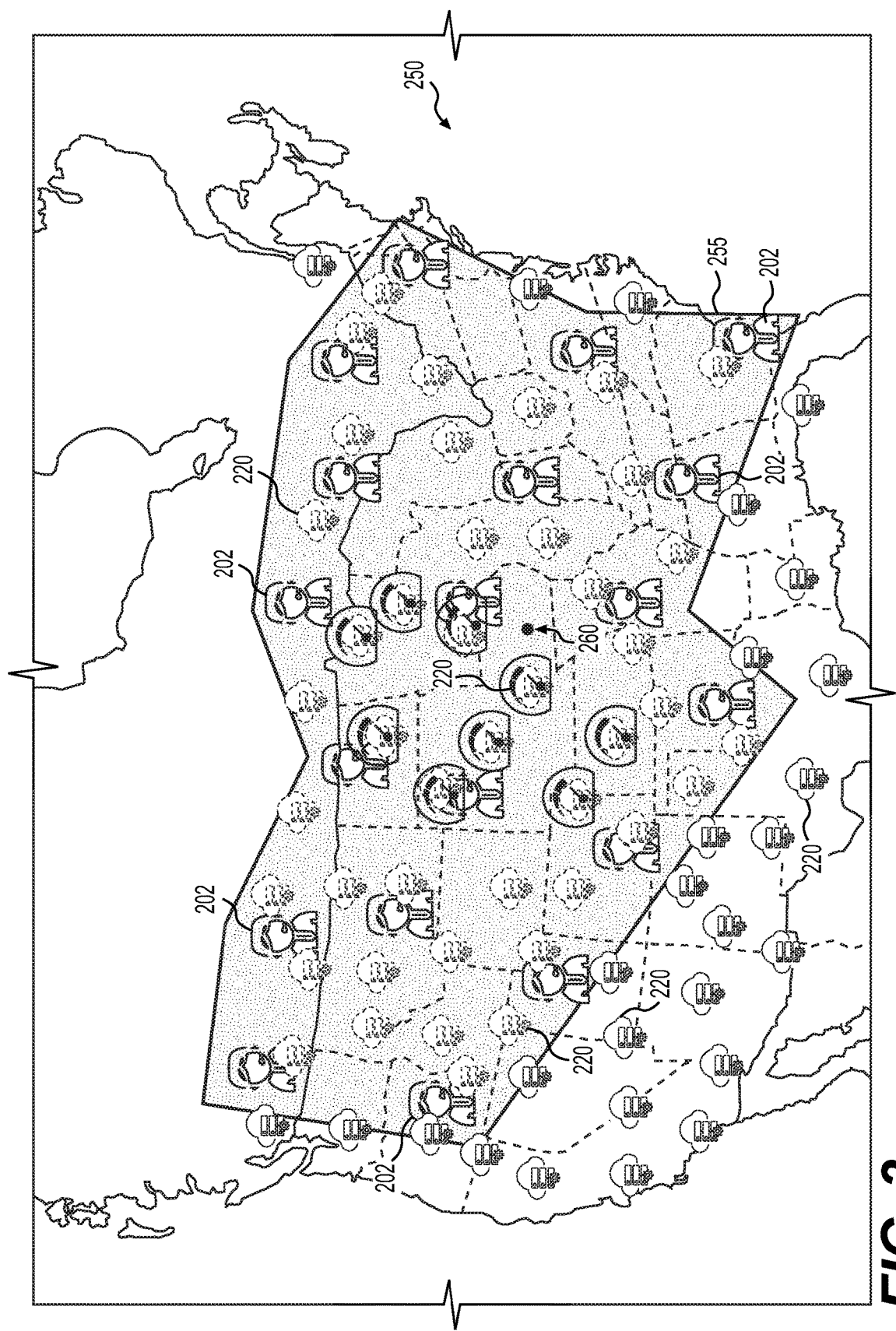
FIG. 3 is an example of a geographical distribution of devices and of potential serving sites.

FIG. 3 is an example of a geographical distribution of devices and of potential serving sites. A map 250 shows location of a number of devices 202 (schematically illustrated as users 200 in a non-limiting embodiment) and of a large number of sites 220, for example datacenters, micro-sites, Edge computing sites, and the like, all of which are geographically distributed. The devices 202 are geo-located based on the IP addresses. In an embodiment, a longitude and a latitude of each device 202 may be obtained.

Figure 4:
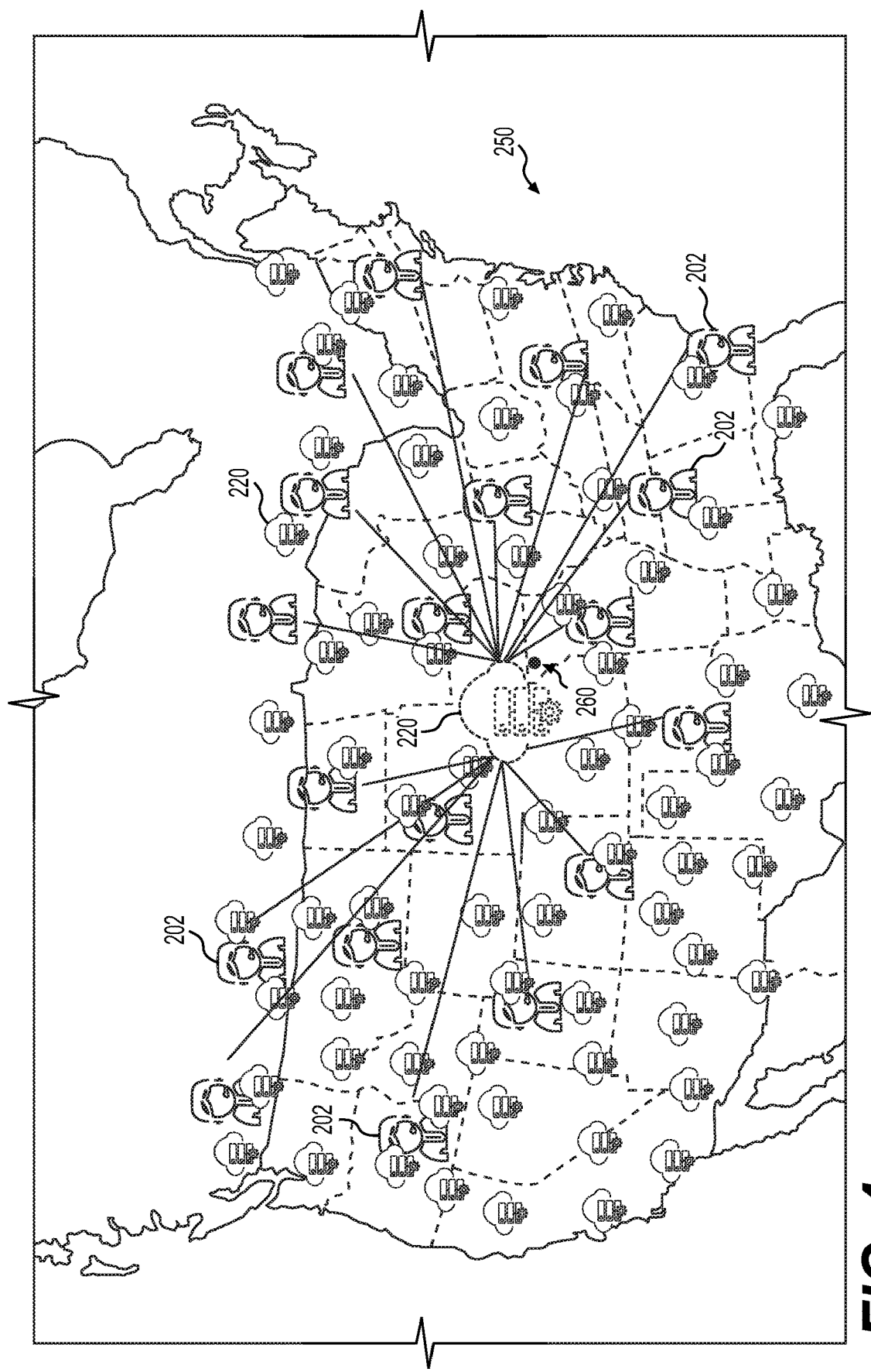
FIG. 4 is an example of a selected site for serving the devices of FIG. 3.

A request is received to start a real-time communication session, for example to set up an online game or a video-conference. This request involves a number of geographically distributed devices 202. A virtual polygon 255 is generated to enclose the devices 202 involved in the request in view of selecting a site 220 to serve the session. Generally speaking, a centroid 260 of the polygon 255 is calculated as an arithmetic mean position of the devices 202 within the polygon 255. This centroid 260 is substantially equivalent to a center of mass of the polygon 255. FIG. 4 is an example of a selected site for serving the devices of FIG. 3. A particular serving site 220' has been selected for serving the devices 202 involved in the real-time communication session, the serving site 220' being closest to the centroid 260 among all serving sites 220 located within the polygon 250.

In an embodiment, selection of the serving site 220 among a plurality of potential serving sites 220 involves more than simply determining the potential serving site that is closest to the centroid 260 of the polygon. Calculation of the centroid 260 of the polygon may be skewed by allocating different weights to different devices 202. A preselection of the potential serving sites 220 may be made in view of a QoS that potential serving sites 220 can offer to the various devices. The serving site 220 may further be selected according to their capabilities and to the needs of a particular session. As an example, various potential serving sites 220 may have different processing power ranges, may hold various amounts of memory, may include specialized processors such as graphical processing units, special hardware for IP television (IPTV), voice over IP (VoIP), and the like. A current load of the potential serving sites 220 may also impact the preselection process.

Figure 5:
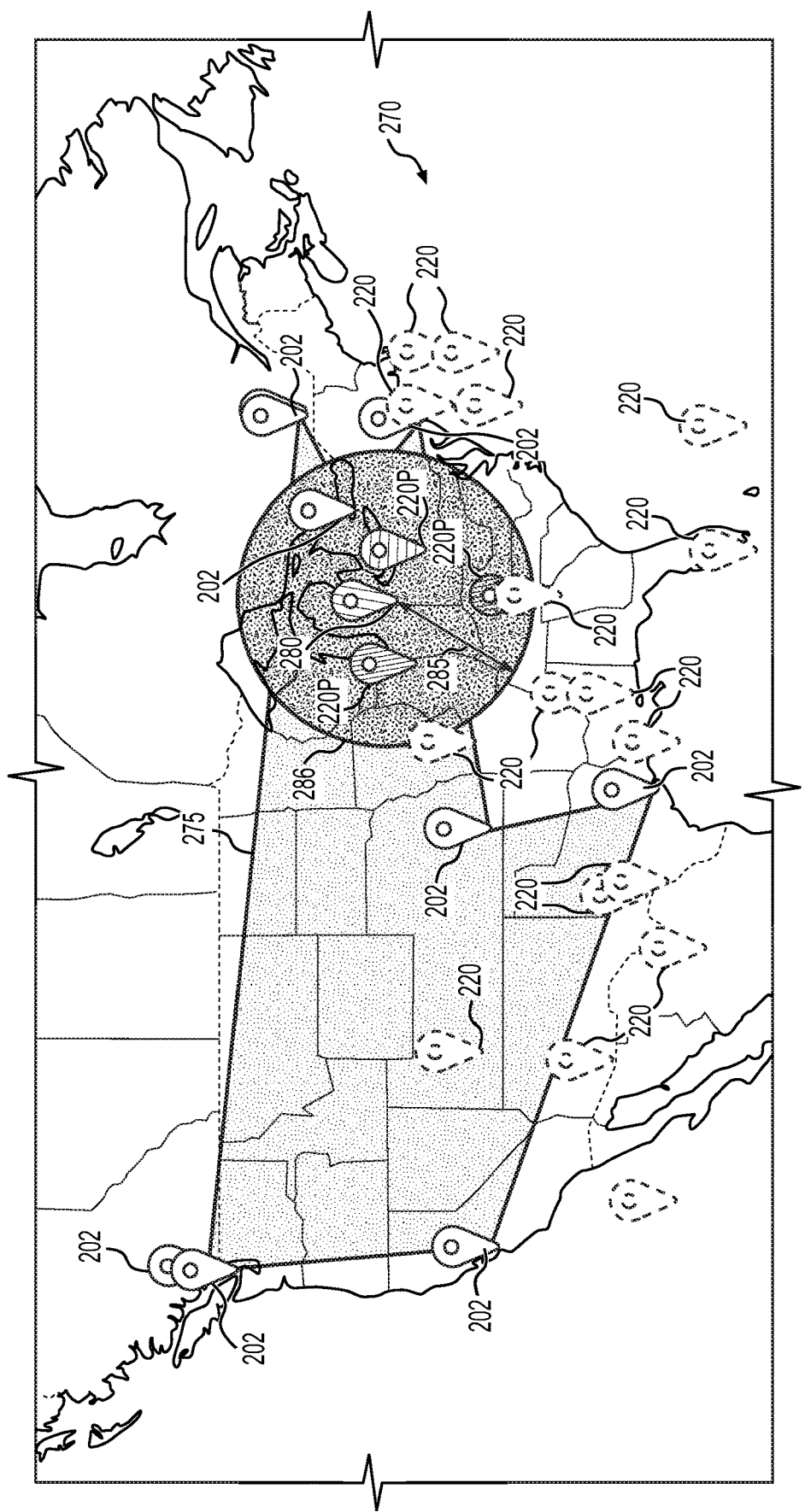
FIG. 5 is another example of a geographical distribution of devices and of potential serving sites showing a virtual polygon and a centroid for the virtual polygon.

FIG. 5 is another example of a geographical distribution of devices and of potential serving sites showing a virtual polygon and a centroid for the virtual polygon. A map 270 shows a distributed of devices 202 to be connected as a part of a session. Devices 202 are distributed geographically, as in the previous examples. One or more device 202 may be identified by each dot shown with reference number 202 on FIG. 5. A virtual polygon 275 is generated to include all devices 202 that are part of a session that is being established. A centroid 280 of the virtual polygon 275 is calculated. It may be observed that the centroid 280 does not appear to be centrally located within the virtual polygon 275; there may be at least two (2) reasons for this.

Firstly, although some of the devices 202 are located on the West Coast, a much larger number of devices 202 may be closer to the East Coast and each dot identified with the reference number 202 on the eastern part of the map 270 may represent a large number of devices 202.

Secondly, weights may be assigned to the various devices 202 in order to prevent a situation where a very distant device 202 could have a strong impact on the location of the centroid 280. A first intermediate centroid of the virtual polygon 275 may be calculated. Then, a predetermined distance around the intermediate centroid is used to assign weights to the various devices 202. A high weight is assigned to devices 202 that are located within the predetermined distance from the intermediate centroid. A lower weight is assigned to devices 202 that are located further from the intermediate centroid than the predetermined distance. For example, for an online game, the predetermined distance may be of a few hundreds of kilometers in order to favor the selection of a serving site that is proximally located to gamers. To illustrate, gamers that are located on the North American East Coast may be assigned a unitary weight and gamers located on the West Coast or even in another continent may be assigned a weight of one tenth. In another example in which business participate in a videoconference, the predetermined distance may be defined on a continental basis so that three (3) participants located in North America may be assigned a unitary weight and two (2) participants respectively located in Europe and in Asia may be assigned a weight of one tenth. Many more non-limiting examples for setting the predetermined distance and the first and second weights may be contemplated.

The centroid 280 of FIG. 5 is calculated in view of the location of the various devices 202 and as a function of weights assigned to the various devices 202 in view of their distance from a first intermediate centroid.

A site selection range 285 is defined around the centroid 280. This site selection range 285 may define a circular area 286 around the centroid 280, although parts of the circular area 286 may be excluded from consideration, for example when the circular area 286 crosses an area of permitted use for the present technology, for example an international frontier. In the non-limiting example of FIG. 5, some parts of the circular area 286 extend beyond the perimeter of the virtual polygon 275. The potential serving sites 220 that are located within the circular area 286 are preselected for serving the session; these preselected sites are identified with the reference 220P and there are three (3) such sites identified in the non-limiting example of FIG. 5.

Figure 6:
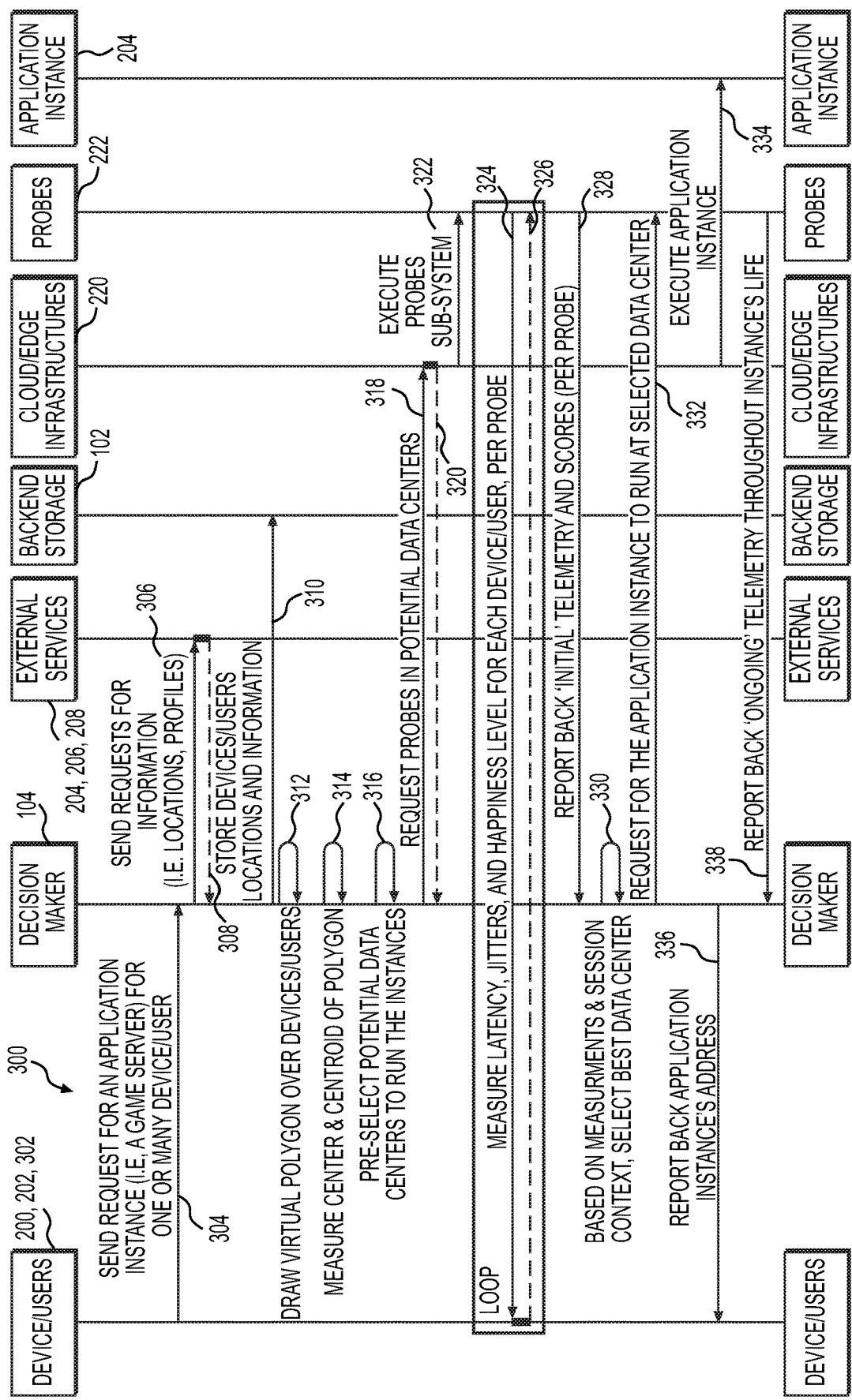
FIG. 6 is an example sequence diagram illustrating various signals exchanges within the network of FIG. 1.

After the preselection of the potential serving sites 220P, a further selection is made based on an evaluation of the QoS that the potential serving sites 220P can offer to the devices 202 involved in the session. An embodiment of a complete sequence for selecting the serving site 220 is illustrated in FIG. 6, which is an example sequence diagram illustrating various signals exchanges within the network of FIG. 1. A sequence 300 is initiated when users 200 or devices 202, that will now be referred to as 'participants' 302 to a session, send requests 304 for establishing the session to the decision maker 104 of the site sequence selector 100. The request 304 may include parameters for the session, including for example a type of the device 202 used by the participant 302, a service level agreement for the user 200, an application type for the session, and the like. A plurality of requests 304 corresponding to the session may be received from a plurality of participants 304 at the decision maker 104. Alternatively, an intermediate node (for example the application server 204 that corresponds to the application type) may send a combined request for the plurality of participants 302 to the session.

The decision maker 104 may send requests 306 for information to the application server 204 for the application, the 206 and/or the 208 and receive a response 308. Information contained in the response 308 may be stored 310 in the data repository 102 of the site selection controller 100.

The decision maker 104 draws 312 the virtual polygon 275 and calculates 314 the location of the centroid 280. The decision maker 104 then preselects 317 a number of potential serving sites 220P that are located within the site selection range 285 around the centroid 280. The decision maker 104 sends a probe request 318 to each of the preselected sites 220 that may in turn reply with an acknowledgement 320. The probe requests 318 include an identify, for example an IP address, of each participant 302 to the session. Each preselected site 220 causes 322 its probe device 222 to send a probe 324, for example an Internet control message protocol (ICMP) ping signal, to each of the participants 302. Probe responses 326, for example ping responses, are received at the probe devices 222 and reported to the corresponding preselected sites 220.

In an embodiment, the probes 324 and the probe responses 326 may comprise a single signal pair exchanged between each preselected site 220 and each participant 302 to measure latency values between the preselected sites 220 and the participants 302. In another embodiment, a plurality of signal pairs may be exchanged to obtain a better estimate of the latency values and further to estimate jitter between the preselected sites 220 and the participants 302.

Each preselected site 220 (or its associated probe 222) sends a probe response 328 to the decision maker 104. The probe response 328 may include latency values and jitter values reflecting a QoS that the participants 302 may expect from the site 220. The decision maker 104 may calculate a score for each preselected site 220 based on the latency and jitter values. Alternatively, the score may be calculated by the preselected site 220 and be included in the probe response 328.

In a non-limiting embodiment, the score may be calculated as follows. A high score value (for example 100) may be allocated when the latency for between the probe 324 and the response 326 is negligible, for example five (5) milliseconds (ms) or less. The score diminishes as the latency increases, reaching a value of 60 when the latency is 50 ms. A very low score value (for example zero (0)) is given when the latency exceeds 100 ms or when no response 326 is received following the issuance of a probe 324.

In a non-limiting example, latency values follow a normal distribution curve. Good scores of 60 or higher may be allocated in response to latency values that are in the lowest 15 percentile of latency values according to data accumulated over time for a population of potential serving sites.

When a plurality of probes 324 are sent and a plurality of responses 326, an average of the scores may be calculated. Use of a plurality of probes 324 and responses 326 also allows detecting jitter between probes and responses. Jitter is considered very low when the latency values between successive probes 324 and responses 326 vary by less than 5 ms. Any greater variability of the latency values, indicative of some jitter between a preselected site and a participant 302, may be used to decrease the score initially calculated based on the latency values. For example, a jitter value calculated based on the jitter may vary between zero (0) when the jitter is of 5 ms or less and −100 when the jitter reaches 50 ms. This value is added to the score based on the latency values to yield a final score. In this example, a best possible score has a value of 100 and a worst score may be as low as −100.

The decision maker 104 selects 330 one of the preselected sites 220 as the serving site 220 for the session according to the best score among the scores for all preselected sites 200. The decision maker 104 may send a request 332 a start of an application instance for the session to the selected site 220. The selected site 220 communicates 334 with the application server 204 for the application type of the session to execute an application instance. The decision maker 104 also sends an address of the selected serving site 220 to the participants 302 to allow the session to be established between the participants 302 and the selected serving site 220. Optionally, the selected serving site 220 or its probe 222 may report telemetry information to the decision maker 104 in view of acquiring performance data for the selected serving site 220. Accumulated performance data may eventually be combined in the decision maker 104 into an efficiency report for use by the machine learning instance 230 to improve future site selection sequences.

Figure 7:
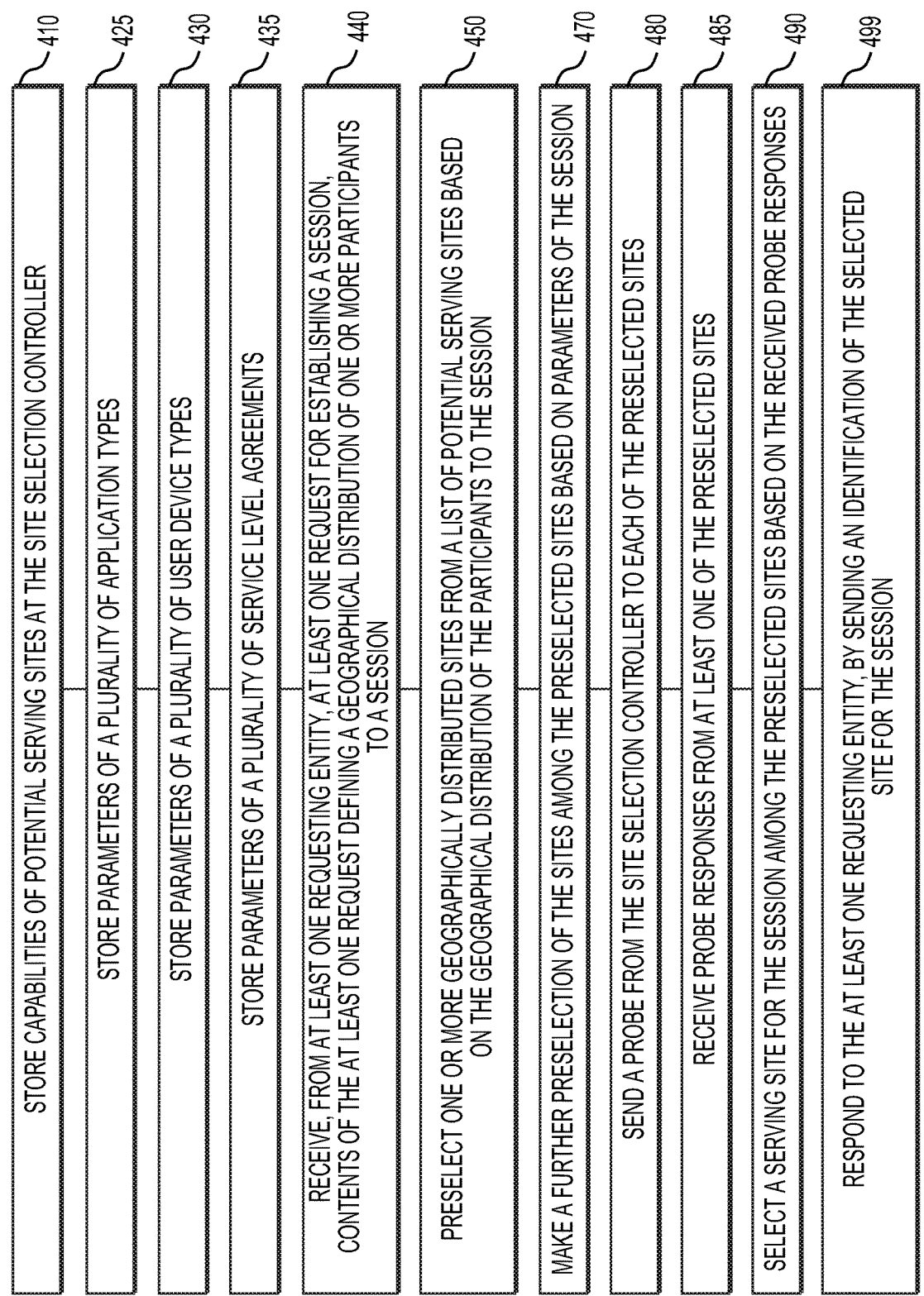
FIG. 7 is a flowchart of a method implemented in a site selection controller according to an embodiment.

FIG. 7 is a flowchart of a method implemented in a site selection controller according to an embodiment. On FIG. 7, a sequence 400 comprises a plurality of operations, some of which may be executed in variable order, some of the operations possibly being executed concurrently, some of the operations being optional. At operation 410, capabilities of potential serving sites 220 are stored at the site selection controller 100. Parameters of a plurality of application types are stored at operation 425. Parameters of a plurality of user device types are also stored in the site selection controller at operation 430. Further, at operation 435, parameters of a plurality of service level agreements are stored at the site selection controller 100.

The site selection controller 100 receives, from at least one requesting entity, at least one request for establishing a session at operation 440. Contents of the at least one request define a geographical distribution of one or more participants 302 to a session. In the context of the present disclosure, a participant 302 to a session may comprise a user 200, a device 202 controlled by a user 200, or an autonomous device 202.

In a first non-limiting case, the at least one request may comprise one or more individual requests from one or more corresponding requesting entities, for example from a plurality of participants 302 to the session. In this first case, a content of each individual request identifies a corresponding participant 302 to the session and a geographical location of the corresponding participant 302 to the session. In this first case, the site selection controller 100 may at least a predetermined number of individual requests for defining the geographical distribution of the participants 302 to the session making a selection of a serving site among the potential serving sites. In a second non-limiting case, a single request from a single requesting entity, for example an application server 204 for the session, may identify a plurality of participants 302 to the session and a geographical location of each of the plurality of participants 302 to the session. In this second case, the site selection controller 100 may directly proceed with the selection of the serving site 220.

At operation 450, the site selection controller 100 preselects one or more geographically distributed sites 220 from a list of potential serving sites 220 based on the geographical distribution of the participants 302 to the session. The site selection controller 100 may, at operation 470, make a further preselection of the sites among the preselected sites based on parameters of the session received as a part of the at least one request for establishing the session. In response, a probe request is sent from the site selection controller 100 to each of the preselected sites 220 at operation 480. The site selection controller 100 should receive probe responses from at least one of the preselected sites 220 at operation 485. The site selection controller 100 then selects a serving site 220 for the session among the preselected sites 220 based on the received probe responses. The site section controller 100 can then respond to the at least one requesting entity, by sending an identification of the selected site 220 for the session at operation 499.

Figure 8:
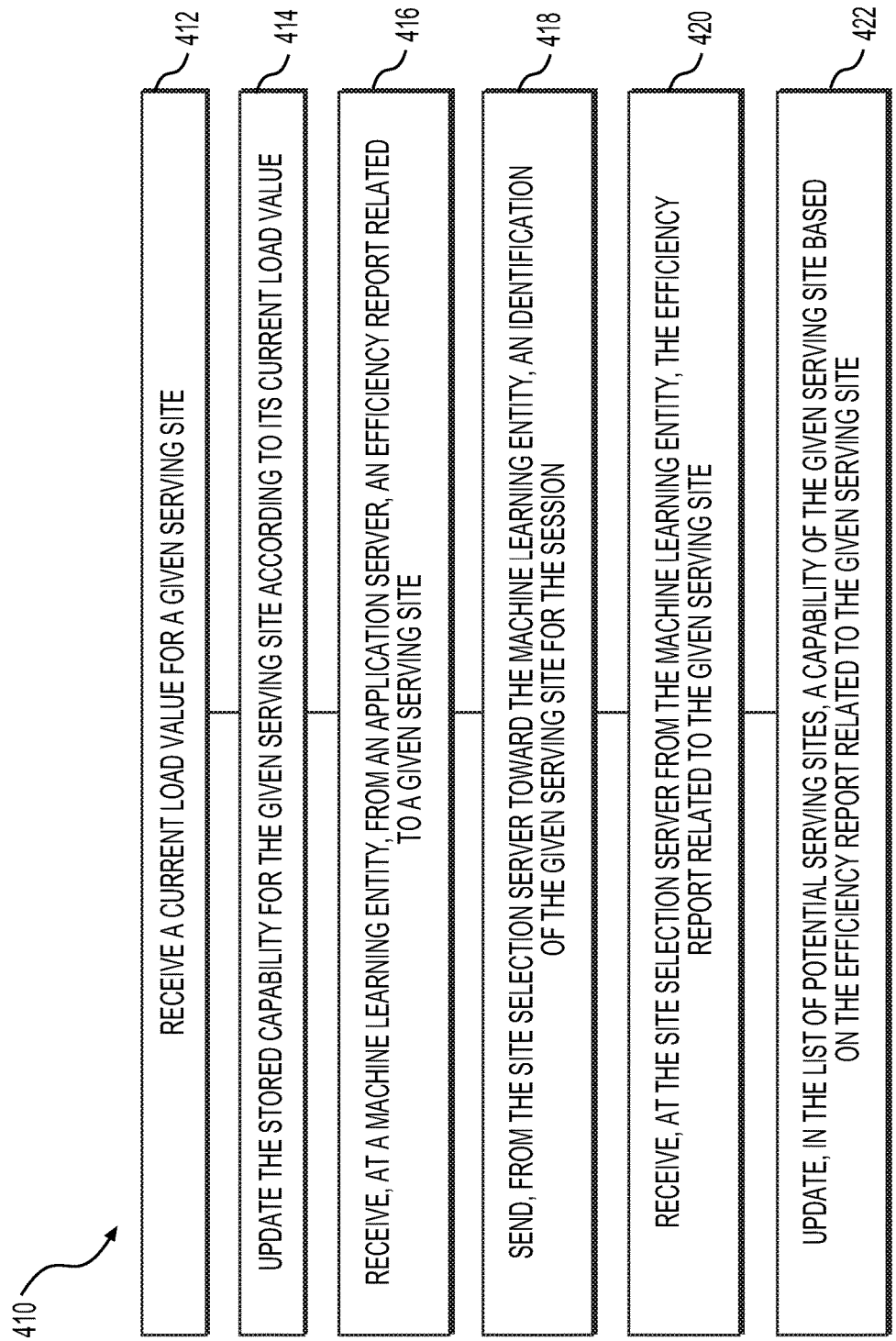
FIG. 8 is a flowchart of a routine for storing and updating capabilities of potential serving sites at the site selection controller.

FIG. 8 is a flowchart of a routine for storing and updating capabilities of potential serving sites at the site selection controller. On FIG. 8, a routine 410 that forms an example embodiment of operation 410 of FIG. 7 comprises a plurality of operations, some of which may be executed in variable order, some of the operations possibly being executed concurrently, some of the operations being optional. In the embodiment of FIG. 8, operation 410 for storing the capabilities of potential serving sites 220 at the site selection controller 100 comprises the following sub-operations. At sub-operation 412, the site selection controller 100 receives a current load value for a given serving site 220. In response, the site selection controller 100 updates the stored capability for the given serving site 220 according to its current load value. Alternatively or in addition, a machine learning entity 230 may receive, at sub-operation 416, from an application server 204, an efficiency report related to a given serving site 220. The efficiency report may indicate that the given serving site 220 was very effective, or not effective, in supporting an application for the application server 204. The site selection controller 100 then sends an identification of the given serving site 220 for the session toward the machine learning entity 230 at sub-operation 418. In turn, the site selection controller 100 receives, from the machine learning entity 230, the efficiency report related to the given serving site 220 at sub-operation 420. At sub-operation 422, the site selection controller 100 updates, in the list of potential serving sites 220, a capability of the given serving site 220 based on the efficiency report related to the given serving site 220.

Figure 9:
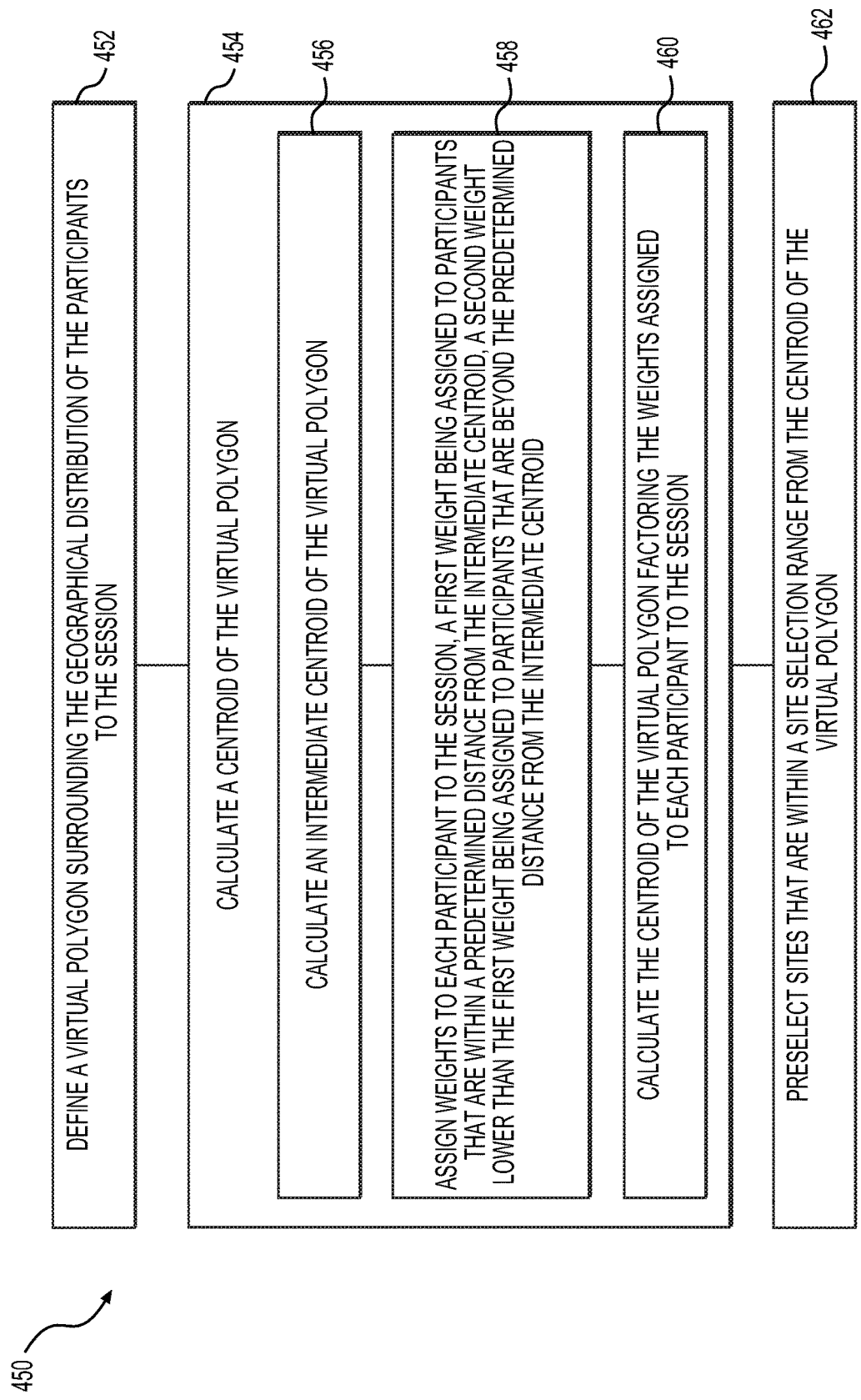
FIG. 9 is a flowchart of a routine for preselecting one or more geographically distributed sites from a list of potential serving sites based on the geographical distribution of the participants to the session.

FIG. 9 is a flowchart of a routine for preselecting one or more geographically distributed sites from a list of potential serving sites based on the geographical distribution of the participants 302 to the session. On FIG. 9 a routine 450 that forms an example embodiment of operation 450 of FIG. 7 comprises a plurality of operations, some of which may be executed in variable order, some of the operations possibly being executed concurrently, some of the operations being optional. A virtual polygon surrounding the geographical distribution of the participants 302 to the session is defined at sub-operation 452. A centroid of the virtual polygon is calculated at sub-operation 454. Sub-operation 454 may further include sub-operations 456, 458 and 460. Sub-operation 456 comprises calculating an intermediate centroid of the virtual polygon. Then, weights are assigned to each participant to the session at sub-operation 458. A first weight is assigned to participants that are within a predetermined distance from the intermediate centroid and a second weight lower than the first weight being assigned to participants that are beyond the predetermined distance from the intermediate centroid. The weight values and the breadth of the predetermined distance may vary according to an application. Following sub-operations 456 and 458, if applicable, the centroid of the virtual polygon may be calculated at sub-operation 460 factoring the weights assigned to each participant to the session. Regardless, sites that are within a site selection range from the centroid of the virtual polygon are preselected at sub-operation 462. This site selection range may have a shorter or longer range than the predetermined distance and may also be determined depending on the application. As illustrated in the example of FIG. 5, some of the preselected sites may be located outside of the virtual polygon.

Figure 10:
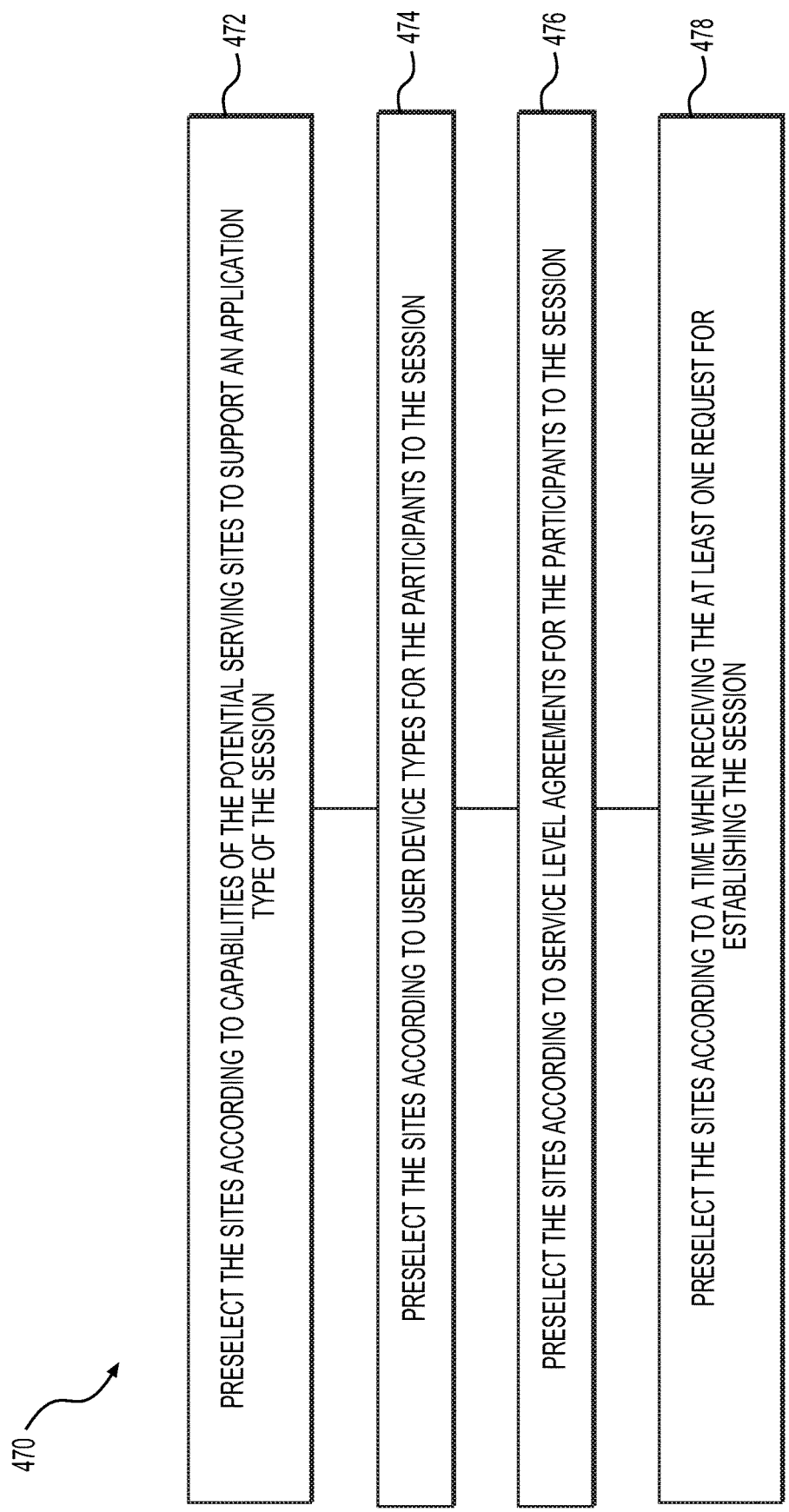
FIG. 10 is a flowchart of a routine for a further preselection of the sites at the site selection controller.

In addition to the preselection of the potential serving sites 220 according to their geographical distribution and according to the geographical distribution of the participants 302, a further preselection may be made according to a variety of parameters related to the session. Although operation 450 precedes operation 470 on FIG. 7, these operations may be executed in variable order. FIG. 10 is a flowchart of a routine for a further preselection of the sites at the site selection controller. On FIG. 10, a routine 470 that forms an example embodiment of operation 470 of FIG. 7 comprises a plurality of operations, some of which may be executed in variable order, some of the operations possibly being executed concurrently, some of the operations being optional. When the at least one request for establishing the section includes an application type of the session, sub-operation 472 may comprise preselecting the serving sites according to their capabilities to support an application type of the session, the serving site capabilities depending for example on the processing capabilities, memory size, current load and eventual presence of specialized hardware. The sites may also be preselected according to user device types for the participants 302 to the session at sub-operation 474 when the at least one request for establishing the section includes user device types for the participants 302 to the session. Sub-operation 476 may comprise preselecting the sites according to service level agreements for the participants 302 to the session when the at least one request for establishing the section includes a service level agreement for the participants 302 to the session. Also, sub-operation 478 may comprise preselecting the sites according to a time when receiving the at least one request for establishing the session. In sub-operation 478, the time may refer to a time of the day, a day of the week or a particular date.

Figure 11:
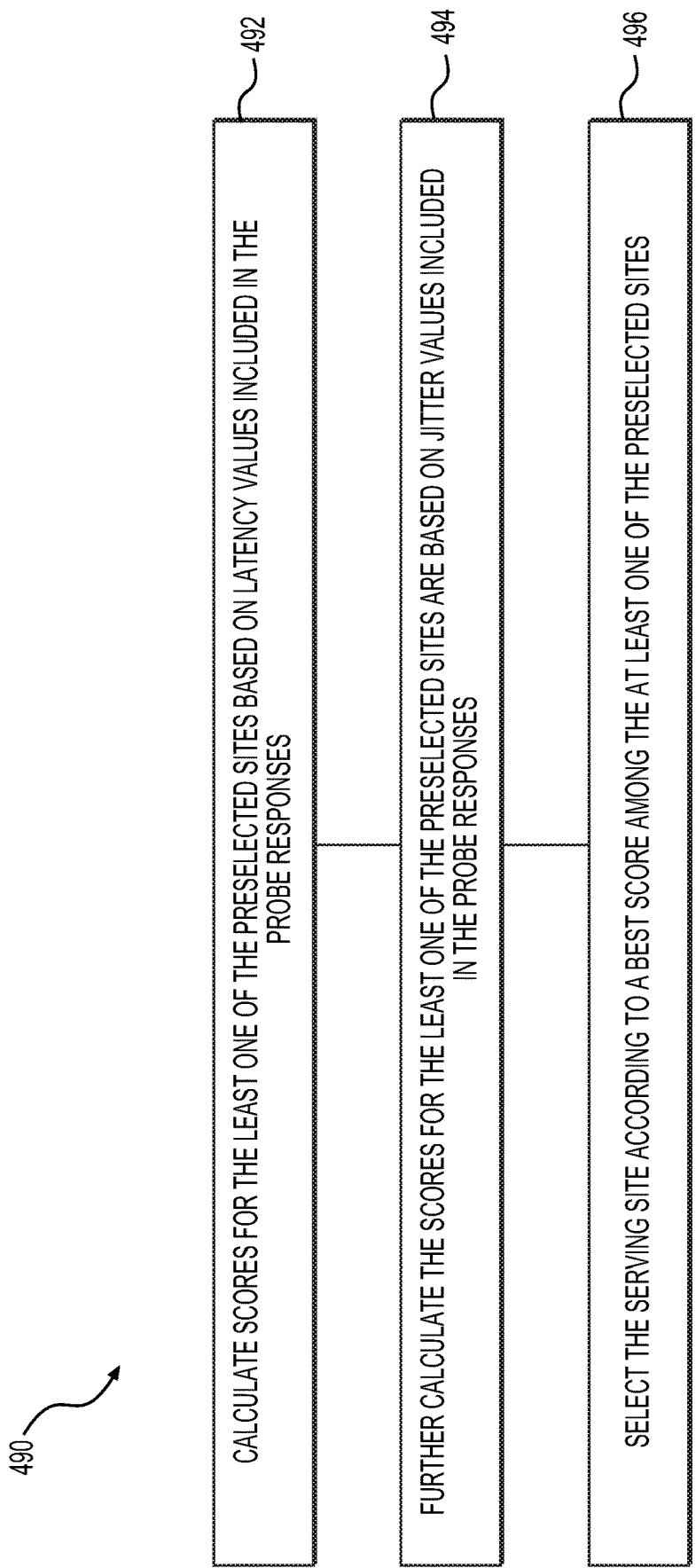
FIG. 11 is a flowchart of a routine for selecting a serving site at the site selection controller

FIG. 11 is a flowchart of a routine for selecting a serving site at the site selection controller. On FIG. 11, a routine 490 that forms an example embodiment of operation 490 of FIG. 7 comprises a plurality of operations, some of which may be executed in variable order, some of the operations possibly being executed concurrently, some of the operations being optional. At operation 490, the serving site is selected based on the received probe responses. In the embodiment of FIG. 11, scores for the least one of the preselected sites are calculated at sub-operation 492 based on latency values included in the probe responses. The latency value for a preselected site is indicative of latencies between that preselected site and each participant 302 to the session. Calculation of the scores may further be based on jitter values included in the probe responses at sub-operation 494. The jitter value for a preselected site is indicative of a measure of jitter between that preselected site and each participant 302 to the session. At sub-operation 494, the serving site is selected according to a best score among the at least one of the preselected sites.

Figure 12:
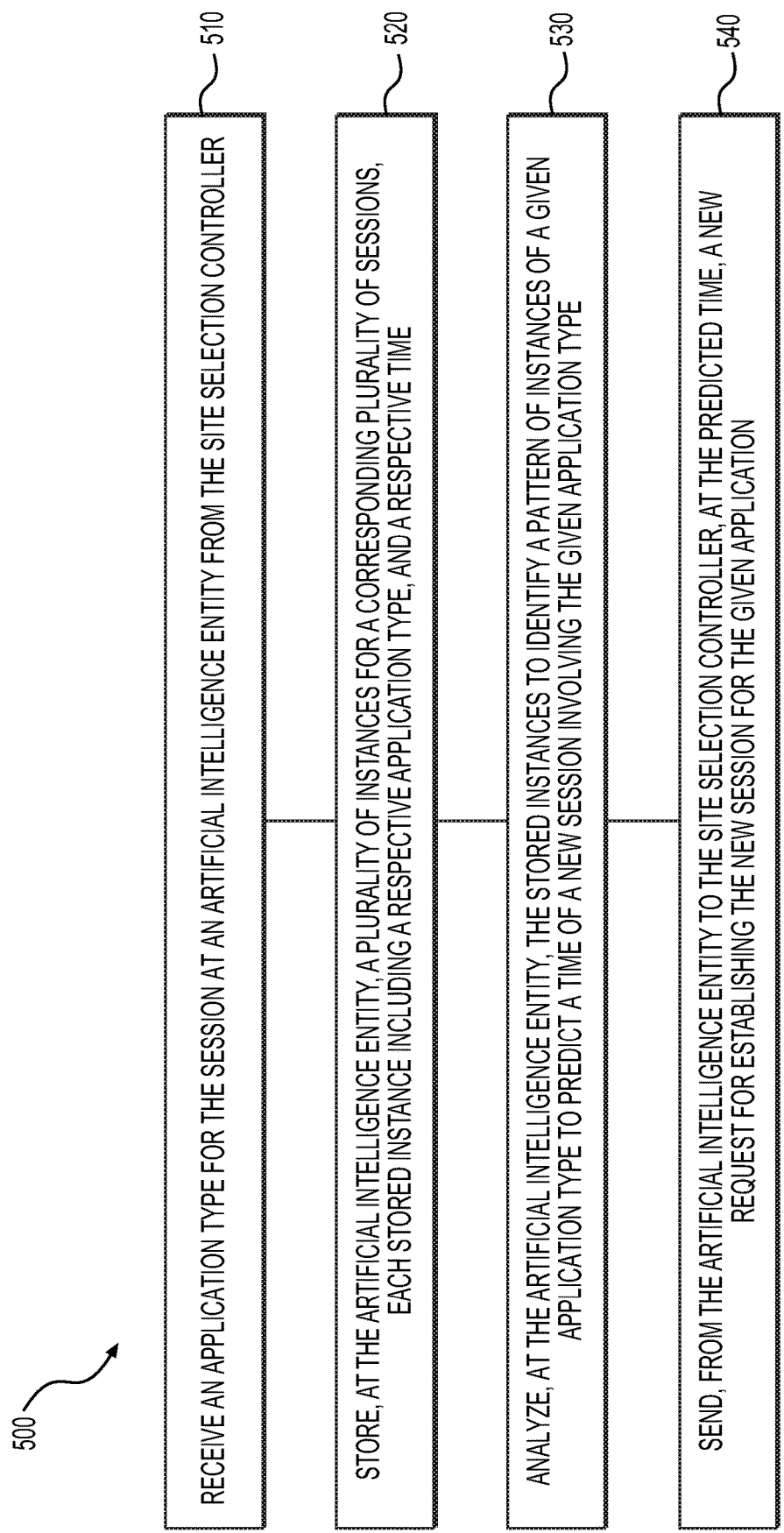
FIG. 12 is a flowchart of a sequence for generating a request for a new session at an artificial intelligence entity.

FIG. 12 is a flowchart of a sequence for generating a request for a new session at an artificial intelligence entity. On FIG. 12, a sequence 500 comprises a plurality of operations, some of which may be executed in variable order, some of the operations possibly being executed concurrently, some of the operations being optional. At operation 510, an application type for the session is received at the artificial intelligence entity 240 from the site selection controller 100. The artificial intelligence entity 240 stores a plurality of instances for the plurality of sessions at operation 520. A stored instance includes a respective application type and a respective time for the session. Operations 510 and 520 are repeated over time as the site selection controller 100 executes the sequence 400 for a plurality of sessions. At operation 530, the artificial intelligence entity 240 analyzes the stored instances to identify a pattern of instances of a given application type. This analysis at the artificial intelligence entity 240 may allow to predict a time of a new session involving the given application type. If so, at the predicted time, the artificial intelligence entity 240 sends to the site selection controller a new request for establishing the new session for the given application at operation 540. The site selection controller 100 may then execute some operations of the sequence 400 ahead of receiving the at least one request for establishing a new session for the given application at operation 440. If such request is not received at operation 440, the site selection controller 100 does not send any response at operation 499 and the request for establishing the new session will have no long term effect on the operation of the network 1.

In an embodiment, the site selection controller 100 may form at least two groups among the participants 302 that are initially requesting the establishment of the session. This action may take place at the time of operation 450, when the geographical distribution of the participants 302 reveals that a performance of the application for the session would benefit. In the non-limiting example of online gaming, the participants 302 may be distributed among the at least two groups based on their respective geographical positions so that all participants 302 of a given group will be in close proximity to one another and in close proximity to a serving site 220. Latency and jitter between the participants 302 of each group and the selected serving site 220 for the group is expected to be minimized in this case. Moreover, several online games involve audio communication between the participants 302 so this division of the participants 302 in smaller groups located in a same geographical area may facilitate the selection of gamers capable of communicating in a common language. Once two or more groups have been so defined, operations 450 to 499 for preselecting the sites 220, sending the probes, receiving the probe responses, selecting the sites 220, and responding to the at least one requesting entity are performed independently for distinct sessions established for each of the at least two groups.

Figure 13:
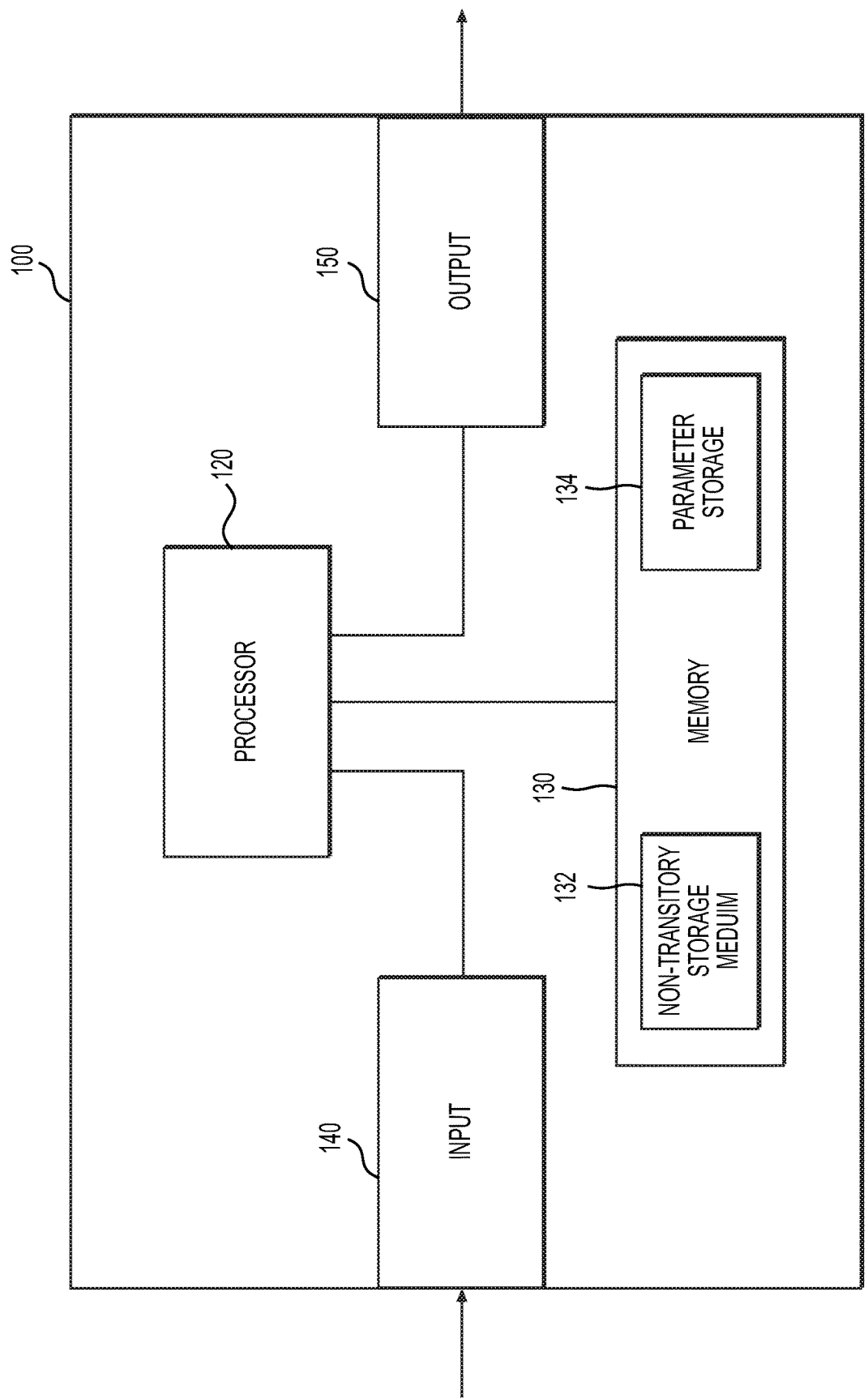
FIG. 13 is a block diagram of the site selection controller according to an embodiment.

The operations of the sequences 400 and 500 as well as the operations of the routines 410, 450, 470 and 490 may be configured to be processed by one or more processors, the one or more processors being coupled to a memory. In particular, some of these operations are implemented in the site selection controller 100. FIG. 13 is a block diagram of the site selection controller according to an embodiment. The site selection controller 100 comprises a processor 120 or a plurality of cooperating processors operatively connected to a memory device 130 or to a plurality of memory devices; only one processor and only one memory device are shown to simplify the illustration.

The memory device 130 includes a non-transitory computer-readable medium 132 having stored thereon machine executable instructions for performing, when executed by the processor 120, the operations of the sequence 400 as well as the operations of the routines 410, 450, 470 and 490. as such, the processor 120 may embody the decision maker 104 introduced in the description of FIG. 1. The memory device 130 also includes a parameter storage 134 in which the processor 120 may read and write various parameters including, in non-limiting examples, the capabilities of the potential serving sites 220, parameters related to various application types, parameters related to various user device types, parameters related to various service level agreements, and information and statuses related to ongoing sessions and processes. Hence, the parameter storage 134 may embody the data repository 102 introduced in the description of FIG. 1.

The processor 120 is communicatively coupled to an input device 140 and to an output device 150 that are part of a network interface for the site selection controller 100. In an embodiment, the input device 140 and the output device 150 may be integrated in a single input/output device. The network interface is adapted to communicate with various components of the network 1, including without limitation the requesting entities such as the devices 202, sources of parameters for the sessions including the application servers 204, the networks 206 and sources of session contexts 208, the potential serving sites 220, the machine learning entity 230 and the artificial intelligence entity 240.

As previously mentioned, in an embodiment, one or both of the machine learning entity 230 and the artificial intelligence entity 240 may be integrated within the site selection controller 200. In an embodiment where the machine learning entity 230 and the artificial intelligence entity 240 are implemented as physical nodes distinct from the site selection controller 100, each of these nodes may be constructed according to a similar structure as that of the site selection controller 100 and include their respective processor, memory device and network interface.

Those of ordinary skill in the art will realize that the description of the method, site selection controller and network for selecting a serving site for a session are illustrative only and are not intended to be in any way limiting. Other embodiments will readily suggest themselves to such persons with ordinary skill in the art having the benefit of the present disclosure. Furthermore, the disclosed method, site selection controller and network may be customized to offer valuable solutions to existing needs and problems related to latency and jitter in real-time communication. In the interest of clarity, not all of the routine features of the implementations of the method, site selection controller and network are shown and described. In particular, combinations of features are not limited to those presented in the foregoing description as combinations of elements listed in the appended claims form an integral part of the present disclosure. It will, of course, be appreciated that in the development of any such actual implementation of the method, site selection controller and network, numerous implementation-specific decisions may need to be made in order to achieve the developer's specific goals, such as compliance with application-, system-, network-, and business-related constraints, and that these specific goals will vary from one implementation to another and from one developer to another. Moreover, it will be appreciated that a development effort might be complex and time-consuming, but would nevertheless be a routine undertaking of engineering for those of ordinary skill in the field of real-time session management having the benefit of the present disclosure.

In accordance with the present disclosure, the components, process operations, and/or data structures described herein may be implemented using various types of operating systems, computing platforms, network devices, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used. Where a method comprising a series of operations is implemented by a computer, a processor operatively connected to a memory, or a machine, those operations may be stored as a series of instructions readable by the machine, processor or computer, and may be stored on a non-transitory, tangible medium.

Systems and modules described herein may comprise software, firmware, hardware, or any combination(s) of software, firmware, or hardware suitable for the purposes described herein. Software and other modules may be executed by a processor and reside on a memory of servers, workstations, personal computers, computerized tablets, personal digital assistants (PDA), and other devices suitable for the purposes described herein. Software and other modules may be accessible via local memory, via a network, via a browser or other application or via other means suitable for the purposes described herein. Data structures described herein may comprise computer files, variables, programming arrays, programming structures, or any electronic information storage schemes or methods, or any combinations thereof, suitable for the purposes described herein.

The present disclosure has been described in the foregoing specification by means of non-restrictive illustrative embodiments provided as examples. These illustrative embodiments may be modified at will. The scope of the claims should not be limited by the embodiments set forth in the examples, but should be given the broadest interpretation consistent with the description as a whole.

What is claimed is:
1. A method implemented in a site selection controller, comprising:
    receiving, at the site selection controller from at least one requesting entity, at least one request for establishing a session, contents of the at least one request defining a geographical distribution of one or more participants to a session;

preselecting, at the site selection controller, one or more geographically distributed sites from a list of potential serving sites based on the geographical distribution of the participants to the session;

sending a probe request from the site selection controller to each of the preselected sites;

receiving, at the site selection controller, probe responses from at least one of the preselected sites;

selecting, at the site selection controller, a serving site for the session among the preselected sites based on the received probe responses; and responding, from the site selection controller to the at least one requesting entity, by sending an identification of the selected site for the session;

wherein the probe responses received from the least one of the preselected sites include latency values indicative of latencies between the at least one of the preselected sites and each participant to the session; and wherein selecting the serving site for the session comprises:
calculating scores for the least one of the preselected sites based on the latency values included in the probe responses, and
selecting the serving site according to a best score among the at least one of the preselected sites.

2. The method of claim 1, wherein the at least one request comprises one or more individual requests, a content of each individual request identifying a corresponding participant to the session and a geographical location of the corresponding participant to the session, the method further comprising accumulating at the site selection controller at least a predetermined number of individual requests for defining the geographical distribution of the participants to the session before preselecting the one or more geographically distributed sites.

3. The method of claim 1, wherein the at least one request comprises a single request identifying a plurality of participants to the session and a geographical location of each of the plurality of participants to the session.

4. The method of claim 1, wherein:
the probe responses received from the least one of the preselected sites further include jitter values indicative of jitter between the at least one of the preselected sites and each participant to the session; and
the scores for the least one of the preselected sites are further calculated based on the jitter values included in the probe responses.

5. The method of claim 1, wherein preselecting one or more geographically distributed sites based on the geographical distribution of the to the session comprises:
defining, at the site selection controller, a virtual polygon surrounding the geographical distribution of the participants to the session;
calculating, at the site selection controller, a centroid of the virtual polygon; and
preselecting sites that are within a site selection range from the centroid of the virtual polygon.

6. The method of claim 5, further comprising:
calculating, at the site selection controller, an intermediate centroid of the virtual polygon; and
assigning, at the site selection controller, weights to each participant to the session, a first weight being assigned to participants that are within a predetermined distance from the intermediate centroid, a second weight lower than the first weight being assigned to participants that are beyond the predetermined distance from the intermediate centroid;

wherein the centroid of the virtual polygon is calculated factoring the weights assigned to each participant to the session.

7. The method of claim 1, wherein:
the at least one request for establishing the session further include an application type for the session; and
the site selection controller further preselects the sites from the list of potential serving sites according to capabilities of the potential serving sites to support the application type of the session.

8. The method of claim 7, further comprising storing parameters of a plurality of application types at the site selection controller.

9. The method of claim 1, wherein:
the at least one request for establishing the session further include a user device type each for the one or more participants to the session; and
the site selection controller further preselects the sites from the list of potential serving sites according to the user device types for the participants to the session.

10. The method of claim 9, further comprising storing parameters of a plurality of user device types at the site selection controller.

11. The method of claim 1, wherein:
the at least one request for establishing the session further include a service level agreement each for the one or more participants to the session; and
the site selection controller further preselects the sites from the list of potential serving sites according to the service level agreements for the participants to the session.

12. The method of claim 9, further comprising storing parameters of a plurality of service level agreements at the site selection controller.

13. The method of claim 1, wherein the at least one requesting entity comprises an application server for the session.

14. The method of claim 1, wherein the at least one requesting entity comprises at least one user device of a corresponding at least one participant to the session.

15. The method of claim 1, wherein the site selection controller further preselects the sites from the list of potential serving sites according to a time when receiving the at least one request for establishing the session.

16. The method of claim 1, further comprising:
forming at least two groups among the participants to the session, the participants being distributed among the at least two groups based on their respective geographical positions; and
independently preselecting the sites, sending the probe requests, receiving the probe responses, selecting the sites, and responding to the at least one requesting entity for distinct sessions established for each of the at least two groups.

17. The method of claim 1, further comprising storing the capabilities of the potential serving sites at the site selection controller.

18. The method of claim 17, further comprising:
receiving, at the site selection controller, a current load value for a given one of the potential serving sites; and
updating the stored capability for the given one of the potential serving sites according to its current load value.

19. The method of claim 17, further comprising:
sending, from the site selection controller, the identification of the selected site for the session toward a machine learning entity;
receiving, at the site selection controller, from the machine learning entity, an efficiency report related to the selected site; and
updating, in the list of potential serving sites, a capability of the selected site based on the efficiency report related to the selected site.

20. The method of claim 19, further comprising receiving, at the machine learning entity from an application server, the efficiency report related to the selected site.

21. The method of claim 1, further comprising:
receiving, from the site selection controller at an artificial intelligence entity, an application type for the session;
storing, at the artificial intelligence entity, a plurality of instances for a corresponding plurality of sessions, each stored instance including:
a respective application type, and
a respective time;
analyzing, at the artificial intelligence entity, the stored instances to identify a pattern of instances of a given application type to predict a time of a new session involving the given application type; and
sending, from the artificial intelligence entity to the site selection controller, at the predicted time, a new request for establishing the new session for the given application.

22. A site selection controller, comprising:
a network interface adapted for communicating with at least one requesting entity and with a plurality of potential serving sites;
a processor communicating with the network interface; and
a non-transitory computer-readable medium having stored thereon machine executable instructions for performing, when executed by the processor, the method according to claim 1.

23. A network, comprising:
a plurality of user devices;
at least one application server;
a plurality of potential serving sites;
the site selection controller of claim 22, the site selection controller being in communication with the plurality of user devices, the at least one application server and the plurality of potential serving sites.

24. The network of claim 23, further comprising a machine learning entity in communication with the site selection controller, wherein the site selection controller is further configured to:
send the identification of the selected site for the session toward the machine learning entity;
receive from the machine learning entity an efficiency report related to the selected site from the machine learning entity; and
update, in the list of potential serving sites, a capability of the selected site based on the efficiency report related to the selected site.

25. The network of claim 24, wherein the machine learning entity is adapted to receive the efficiency report related to the selected site from the at least one application server.

26. The network of claim 23, further comprising an artificial intelligence entity configured to:
receive, from the site selection controller, an application type for the session;
store a plurality of instances for a corresponding plurality of sessions, each stored instance including:
a respective application type, and
a respective time;
analyze the stored instances to identify a pattern of instances of a given application type to predict a time of a new session involving the given application type; and
send, to the site selection controller, at the predicted time, a new request for establishing the new session for the given application.

* * * * *